US010602001B2

(12) United States Patent
Moon et al.

(10) Patent No.: US 10,602,001 B2
(45) Date of Patent: Mar. 24, 2020

(54) METHOD FOR IDENTIFYING DATA USAGE AND ELECTRONIC DEVICE IMPLEMENTING THE SAME

(71) Applicant: Samsung Electronics Co., Ltd., Gyeonggi-do (KR)

(72) Inventors: Soohyun Moon, Gyeonggi-do (KR); Jinho Kim, Gyeonggi-do (KR); Hongshik Kim, Seoul (KR); Seunghoon Nam, Gyeonggi-do (KR); Kyuha Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/815,081

(22) Filed: Nov. 16, 2017

(65) Prior Publication Data

US 2018/0139335 A1 May 17, 2018

(30) Foreign Application Priority Data

Nov. 17, 2016 (KR) .................. 10-2016-0153622

(51) Int. Cl.
*H04M 11/00* (2006.01)
*G06F 1/00* (2006.01)
*G06F 11/30* (2006.01)
*H04M 15/00* (2006.01)
*H04L 12/14* (2006.01)
*H04W 4/24* (2018.01)

(52) U.S. Cl.
CPC .......... *H04M 15/852* (2013.01); *H04L 12/14* (2013.01); *H04L 12/1417* (2013.01); *H04M 15/00* (2013.01); *H04M 15/846* (2013.01); *H04W 4/24* (2013.01)

(58) Field of Classification Search
CPC ............. H04M 15/846; H04M 15/852; H04M 15/83–866
USPC ...................................................... 455/405
See application file for complete search history.

(56) References Cited

U.S. PATENT DOCUMENTS

| 2009/0125745 | A1* | 5/2009 | Hyatt | G01R 31/3682 713/340 |
| 2012/0101952 | A1* | 4/2012 | Raleigh | G06Q 30/016 705/304 |
| 2012/0302205 | A1* | 11/2012 | Breitbach | H04L 12/1435 455/406 |
| 2013/0227464 | A1* | 8/2013 | Jin | G06F 3/0485 715/784 |

(Continued)

FOREIGN PATENT DOCUMENTS

KR 1020160027825 3/2016

*Primary Examiner* — Rafael Pérez-Gutiérrez
*Assistant Examiner* — Mark G. Pannell
(74) *Attorney, Agent, or Firm* — The Farrell Law Firm, P.C.

(57) ABSTRACT

An electronic apparatus is disclosed, including a touch screen display; a communication unit configured to transceive data via a network; a processor; and a memory configured to store instructions to, which when executed, instruct the processor to identify a total data usage transceived through the communication unit if the data usage transceived through the communication unit reaches a predetermined reference value, determine whether a difference value between the total data usage and a predetermined warning value satisfies a condition to change the reference value, and change the reference value based on the determination result.

15 Claims, 16 Drawing Sheets

(56) References Cited

U.S. PATENT DOCUMENTS

| | | | |
|---|---|---|---|
| 2016/0142559 A1* | 5/2016 | Pollak | H04M 15/852 |
| | | | 455/406 |
| 2018/0020101 A1* | 1/2018 | Chan | H04M 15/7652 |
| 2018/0035281 A1* | 2/2018 | Erginler | H04W 8/183 |

* cited by examiner

US 10,602,001 B2

METHOD FOR IDENTIFYING DATA USAGE AND ELECTRONIC DEVICE IMPLEMENTING THE SAME

PRIORITY

This application claims priority under 35 U.S.C. § 119(a) to Korean Patent Application Serial No. 10-2016-0153622, which was filed in the Korean Intellectual Property Office on Nov. 17, 2016, the entire content of which is incorporated herein by reference.

BACKGROUND

1. Field of the Disclosure

The present disclosure relates generally to a method for identifying data usage and an electronic device implementing the same.

2. Description of Prior Art

Electronic devices such as smart phones, tablet personal computer (PCs), desktop PCs, portable multimedia players (PMPs), moving picture experts group phase 1 or phase 2 (MPEG-1 or MPEG-2) audio layer 3 (MP3) players, and wearable devices are becoming popular with users. In particular, users may use electronic devices to perform web browsing to do such things as downloading and uploading files, and watching videos.

Normally, an electronic device connects to a network to communicate with a web server, and a network operator may charge an electronic device user for connecting to the web server.

Due to the expense, the user may limit data usage, and the electronic device may identify whether the data usage exceeds a threshold for data usage. The electronic device may identify the data usage each time a certain amount (e.g., 2 MB) of data is used.

However, if the data usage is identified each time a certain amount of data is used, the faster the data communication rate, the more frequent the operation of identifying the data usage becomes, thereby increasing current consumption of the electronic device.

SUMMARY

An aspect of the present disclosure is to provide an apparatus and method that identify a total data usage each time the data usage reaches a reference use value, based on the reference use value that is flexibly changed in response to the data usage of the user.

In accordance with an aspect of the present disclosure, an electronic apparatus is provided, which includes a touch screen display; a communication unit configured to transceive data via a network; a processor; and a memory configured to store instructions, which when excuted, instruct the processor to identify a total data usage transceived through the communication unit, if the data usage transceived through the communication unit reaches a predetermined reference value, determine whether a difference value between the total data usage and a predetermined warning value satisfies a condition to change the reference value, and change the reference value based on the determination result.

In accordance with another aspect of the present disclosure, a method is provided for identifying data usage. The method includes identifying a total data usage transceived if the data usage transceived reaches a predetermined reference value; determining whether a difference value between the total data usage and a predetermined warning value satisfies a condition to change the reference value; and changing the reference value based on the determination result.

In accordance with another aspect of the present disclosure, a non-transistory recording medium is provided with a program, to identify a total data usage transceived if the data usage transceived reaches a predetermined reference value; determine whether a difference value between the total data usage and a predetermined warning value satisfies a condition to change the reference value; and change the reference value based on the determination result.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
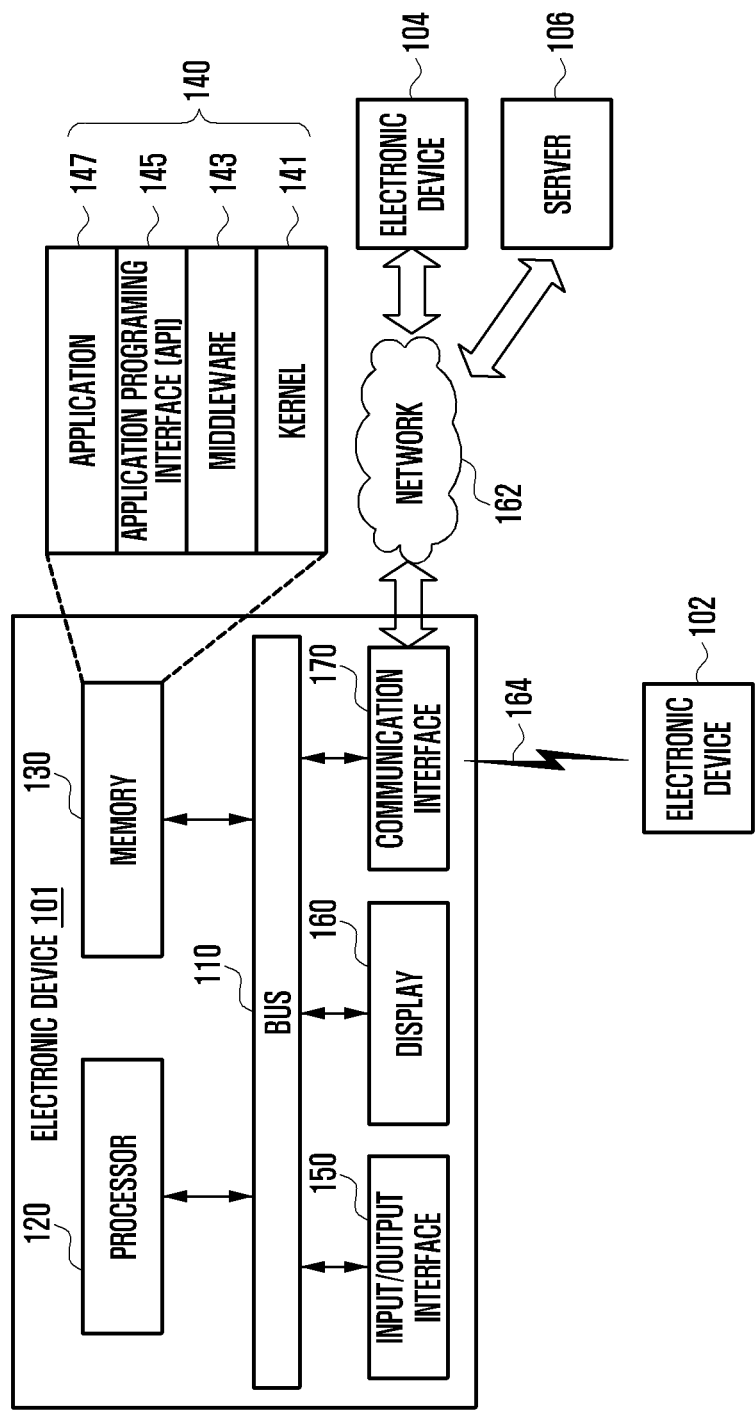
FIG. 1 is a block diagram of an electronic device within a network environment according to an embodiment of the present disclosure

Various embodiments of the present disclosure are described below with reference to the accompanying drawings. This disclosure includes various specific details to assist in the understanding, but these details are to be regarded as mere embodiments. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description are not limited to their dictionary meanings, but are used to provide a clear and consistent understanding of the present disclosure. Accordingly, the following description of embodiments of the present disclosure is provided for illustration purposes and not for the purpose of limiting the present disclosure which is defined by the appended claims and their equivalents.

Herein, singular forms such as "a", "an", and "the", include plural forms as well unless the context clearly dictates otherwise. Thus, for example, reference to "a component surface" includes a reference to one or more of such surfaces.

The expressions "include", "have", and "may include", which may be used in the present disclosure, denote the presence of the disclosed functions, operations, and elements, but do not limit one or more additional functions, operations, and elements. The expression "and/or" includes any and all combinations of the associated listed words. Accordingly, the expression "A and/or B" may include A, may include B, or may include both A and B.

Expressions including ordinal numbers, such as "first", "second", etc., may modify various elements. However, such elements are not limited by the above expressions. The above expressions do not limit the sequence and/or importance of the elements, but are used merely for the purpose of distinguishing an element from the other elements. For example, a first user device and a second user device indicate different user devices, although both are user devices. As another example, a first element may be referred to as a second element, and similarly, a second element may also be referred to as a first element without departing from the scope of the present disclosure.

When a component is referred to as being "connected to" or "accessed by" another component, the component may be connected to or accessed by the other component, or another component may exist between the component and the other component. However, when a component is referred to as being "directly connected" or "directly accessed" to another component, there is no component therebetween.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be interpreted to have ideal or excessively formal meanings.

According to an embodiment of the present disclosure, an electronic device may include a smailphone, a tablet PC, a mobile phone, a video phone, an e-book reader, a desktop PC, a laptop PC, a netbook computer, a personal digital assistant (PDA), a portable multimedia player (PMP), a digital audio player (e.g., an MP3 player), a mobile medical device, a camera, or a wearable device. Examples of the wearable device include a head-mounted-device (HMD) (e.g., electronic eyeglasses), electronic clothing, an electronic bracelet, an electronic necklace, an accessory, an electronic tattoo, a smart watch, etc.

The electronic device may also include various smart home appliances, such as a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, etc.

The electronic device may also include a medical device (e.g., a magnetic resonance angiography (MRA) device, a magnetic resonance imaging (MRI) device, a computed tomography (CT) device, a scanning machine, an ultrasonic scanning device, etc.), a navigation device, a global positioning system (GPS) receiver, an event data recorder (EDR), a flight data recorder (FDR), a vehicle infotainment device, an electronic equipment for ships (e.g., navigation equipment, gyrocompass, and etc.), avionics, a security device, a head unit for vehicles, an industrial or home robot, an automatic teller machine (ATM), a point of sales (POS) system, etc.

The electronic device may also include furniture or a portion of a building/structure, an electronic board, an electronic signature receiving device, a projector, a measuring instrument (e.g., a water meter, an electric meter, a gas meter and a wave meter), etc. In addition, the electronic device may be a flexible and/or contoured device. The electronic device may also include a combination of the devices listed above. However, the electronic device is not limited to the aforementioned devices.

In the present disclosure, the term 'user' may refer to a person or a device (e.g., an artificial intelligence electronic device) that uses or otherwise controls the electronic device.

FIG. 1 is a block diagram of an electronic device in a network environment according to an embodiment of the present disclosure.

Referring to FIG. 1, an electronic device 101 includes a bus 110, a processor 120, a memory 130, an input/output (I/O) interface 150, a display 160, and a communication interface 170.

The bus 110 may be a communication circuit that connects the components to each other and transfers data (e.g., control messages) between the components.

The processor 120 may receive instructions from the components (e.g., the memory 130, I/O interface 150, display 160, and communication interface 170) via the bus 110, decode the instructions, and perform corresponding operations or data processing according to the decoded instructions.

The memory 130 may store instructions or data transferred from the processor 120, created in the processor 120 or the other components (e.g., I/O interface 150, display 160, and communication interface 170). The memory 130 includes programming modules 140, i.e., a kernel 141, a middleware 143, an application programming interface (API) 145, and an application module 147. Each of the programming modules 140 may be software, firmware, hardware, or a combination thereof.

The kernel 141 may control or manage system resources (e.g., the bus 110, processor 120, and memory 130) used to execute operations or functions of the programming modules (e.g., the middleware 143), API 145, and application module 147. The kernel 141 may also provide an interface that may access and control/manage the components of the electronic device 101 via the middleware 143, API 145, and application module 147.

The middleware 143 permits the API 145 or application module 147 to perform data communication with the kernel 141. The middleware 143 may also perform control operations (e.g., scheduling and load balancing) for task requests transmitted from the application module 147 using, e.g., a method for assigning the order of priority to use the system resources (e.g., the bus 110, processor 120, and memory 130) of the electronic device 101 to at least one of the applications of the application module 147.

The API 145 is an interface that allows the application module 147 to control functions of the kernel 141 or middleware 143. The API 145 may include at least one interface or function (e.g., instruction) for file control, window control, character control, video process, and the like.

The application module 147 may include applications that are related to short message service (SMS)/multimedia messaging service (MMS), email, calendar, alarm, healthcare (e.g., an application for measuring blood sugar level, a workout application, etc.), and environment information (e.g., atmospheric pressure, humidity, temperature, and etc.). The application module 147 may be an application related to exchanging information between the electronic device 101 and an external electronic device 104. The information exchange related application may include a notification relay application for transmitting specific information to an external electronic device or a device management application for managing external electronic devices.

The notification relay application may include a function for transmitting notification information, created by the other applications of the electronic device 101 (e.g., SMS/MMS application, email application, healthcare application, environment information application, etc.), to the electronic device 104. In addition, the notification relay application may receive notification information from the external electronic device 104 and provide it to the user. The device management application may manage (e.g., install, delete, or update) part of the functions of the external electronic device 104 communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, etc.

The application module 147 may also include applications designated according to attributes (e.g., type of electronic device) of the external electronic device 104. For example, if the external electronic device 104 is an MP3 player, the application module 147 may include an application related to music playback. If the external electronic device 104 is a mobile medical device, the application module 147 may include an application related to healthcare. The application module 147 may include an application designated in the electronic device 101 and applications transmitted from the server 106, electronic device 104, and etc.

The I/O interface 150 may receive instructions or data from the user via an I/O system (e.g., a sensor, keyboard, or touch screen) and transfers them to the processor 120, memory 130, or communication interface 170 through the bus 110. The I/O interface 150 may provide data corresponding to a user's touch input on a touch screen to the processor 120. The I/O interface 150 may receive instructions or data from the processor 120, memory 130, or communication interface 170 through the bus 110, and output them to an I/O system (e.g., a speaker or a display). The I/O interface 150 may output voice data processed by the processor 120 to a speaker.

The display 160 may display information (e.g., multimedia data, text data, and the like) on a screen such that the user may view it.

The communication interface 170 may communicate between the electronic device 101 and an external electronic device 104 or server 106. The communication interface 170 may connect to a network 162 in a wireless or wired mode, and communicate with the external system. Wireless communication may include wireless fidelity (Wi-Fi), Bluetooth™ (BT), near field communication (NFC), GPS, or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), etc.). In addition, the wireless communication may include short-range communication 164.

Wired communication may include universal serial bus (USB), high definition multimedia interface (HDMI), recommended standard 232 (RS-232), plain old telephone service (POTS), etc.

The network 162 may be a telecommunication network including a computer network, the Internet, the IoT, a telephone network, and etc. The protocol for communication between the electronic device 101 and the external system, e.g., transport layer protocol, data link layer protocol, or physical layer protocol, may be supported by at least one of the application module 147, API 145, middleware 143, kernel 141, and communication interface 170.

Figure 2:
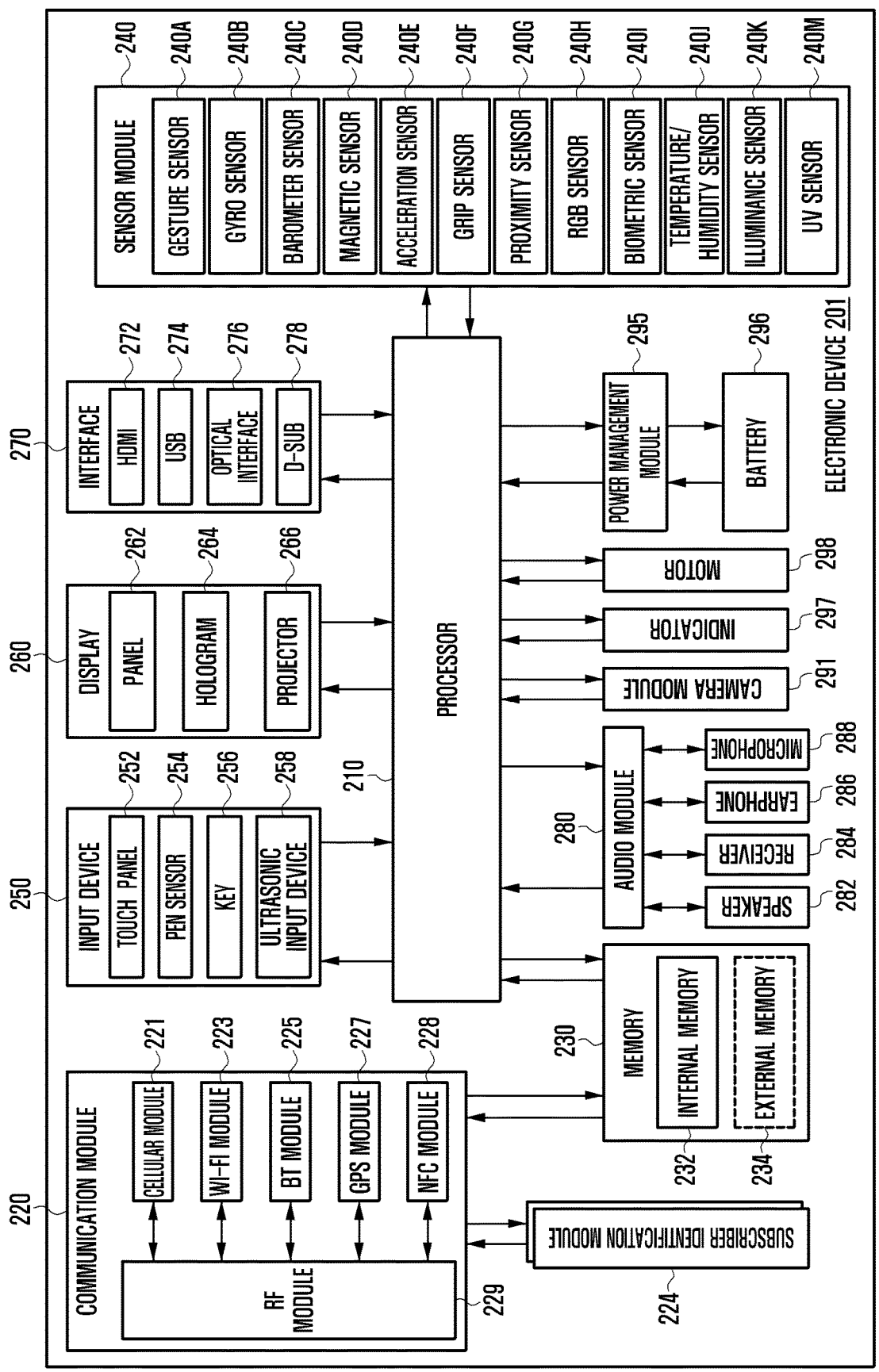
FIG. 2 is a block diagram of an electronic device according to an embodiment of the present disclosure.

FIG. 2 is a block diagram of an electronic device according to an embodiment of the present disclosure.

Referring to FIG. 2, an electronic device 201 includes a processor 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The AP 210 may control a number of hardware or software components connected thereto by executing the operating system or applications, process data including multimedia data, and perform corresponding operations. The AP 210 may be implemented as a system on chip (SoC). The AP 210 may further include a graphics processing unit (GPU).

The communication module 220 may perform communication for data transmission/reception between an electronic device 102 or 104, and server 106 that are connected to the electronic device 101 via a network. The communication module 220 includes a cellular module 221, a Wi-Fi module 223, a BT module 225, a GPS module 227, an NFC module 228, and a radio frequency (RF) module 229.

The cellular module 221 may provide voice call, video call, SMS, Internet service, and the like, via a communication network (e.g., LTE, LTE-A, CDMA, WCDMA, UMTS, Wi-Bro, GSM, etc.). The cellular module 221 may also perform identification or authentication for electronic devices in a communication network by using the SIM 224. The cellular module 221 may perform part of the functions of the AP 210. The cellular module 221 may perform part of the functions for controlling multimedia.

The cellular module 221 may include a communication processor (CP). The cellular module 221 may be implemented with an SoC. The cellular module 221, the power management module 295, the memory 230, etc., may be modified such that the AP 210 includes at least part of the listed elements or other elements of the device 201.

The AP 210 or the cellular module 221 may load instructions or data transmitted to and from at least one of a non-volatile memory or other components, to a volatile memory, and then process them. The AP 210 or the cellular module 221 may also store data, which is transmitted from or created in at least one of the components, in a non-volatile memory.

The Wi-Fi module 223, the BT module 225, the GPS module 227, and the NFC module 228 may include processors for processing transmission and reception of data. The cellular module 221, Wi-Fi module 223, BT module 225, GPS module 227, and NFC module 228 may be modified such that parts of the elements (e.g., two or more) are included in an integrated circuit (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi module 223, may be implemented with an SoC.

The RF module 229 may transmit or receive data, e.g., RF signals. The RF module 229 may include a transceiver, a power amplifier module (PAM), a frequency filter, a low noise amplifier (LNA), etc. The RF module 229 may also include parts for transmitting and receiving electromagnetic waves, e.g., conductors, wires, and the like, via free space during wireless communication. The cellular module 221, Wi-Fi module 223, BT module 225, GPS module 227, and NFC module 228 may be modified such that at least one of the elements transmit or receives RF signals via a separate RF module.

The SIM 224 may be inserted into a slot of the electronic device. The SIM 224 may include unique identification information, e.g., integrated circuit card identifier (ICCID), or subscriber information, e.g., international mobile subscriber identity (IMSI).

The memory 230 includes built-in or internal memory 232 and an external memory 234. The internal memory 232 may include at least one of a volatile memory, e.g., dynamic random access memory (DRAM), static RAM (SRAM), synchronous dynamic RAM (SDRAM), etc., non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.

The internal memory 232 may be a solid state drive (SSD). The external memory 234 may include a flash drive, e.g., compact flash (CF), secure digital (SD), micro-SD, mini-SD, extreme digital (XD), a memory stick, and etc. The external memory 234 may be functionally connected to the electronic device via various types of interfaces. The electronic device 101 may further include storage devices or storage media such as hard drives.

The sensor module 240 may measure a physical quantity or sense operation states of the electronic device 201 and convert the measured or sensed data into electrical signals. The sensor module 240 includes a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (e.g., biometric sensor) 240I, a temperature/humidity sensor 240J, an illuminance sensor 240K, and an ultra-violet (UV) sensor 240M.

The sensor module 240 may also include an electronic nose (e-nose) sensor, electromyography (EMG) sensor, an electroencephalogram (EEG) sensor, an electrocardiogram (ECG) sensor, an infrared (IR) sensor, a fingerprint sensor, an iris sensor, and etc. The sensor module 240 may further include a control circuit for controlling the one or more sensors.

The input device 250 includes a touch panel 252, a pen sensor 254 (i.e., a digital pen sensor or digital stylus), a key 256, and an ultrasonic input device 258. The touch panel 252 may sense a touch using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel may also sense mechanical/physical touches or proximity of an object. The touch panel 252 may further include a tactile layer. The touch panel 252 may also provide tactile feedback to the user.

The pen sensor 254 (e.g., digital pen sensor) may be detected in a same or similar way as receiving a user's touch input or by using a separate recognition sheet. The key 256 may include mechanical buttons, optical keys, or a key pad.

The ultrasonic input device 258 is a device that may sense sounds via a microphone 288 of the electronic device 201 by using an input tool for generating ultrasonic signals, and then receiving and checking data associated with the signals. The ultrasonic input device 258 may sense signals in a wireless mode. The electronic device 201 may also receive a user's inputs from an external system (e.g., another electronic device or server) via the communication module 220.

The display module 260 includes a panel 262, a hologram unit 264, and a projector 266. The panel 262 may be implemented with a liquid crystal display (LCD), active matrix organic light emitting diodes (AMOLEDs), etc. The panel 262 may be implemented in a flexible, transparent, impact-resistant, and/or wearable form. The panel 262 may form a single module with the touch panel 252. The hologram unit 264 may show a three-dimensional image in the air using interference of light. The projector 266 may display images by projecting light on a screen. The screen may be placed, for example, inside or outside of the electronic device 201. The display module 260 may further include a control circuit for controlling the panel 262, the hologram unit 264, or the projector 266.

The interface 270 includes an HDMI 272, a USB 274, an optical interface 276, and a D-subminiature (D-sub) 278. The interface 270 may include a mobile high-definition link (MHL) interface, an SD card, a multi-media card (MMC) interface, an Infrared Data Association (IrDA) standard interface, etc.

The audio module 280 may provide conversions between audio and electrical signals. The audio module 280 may process audio output from and input to, e.g., a speaker 282, a receiver 284, earphones 286, and the microphone 288.

The camera module 291 may take still images or moving images. The camera module 291 may include one or more image sensors (e.g., on the front side and/or the back side), a lens, an image signal processor (ISP), a flash (e.g., an LED or a xenon lamp), etc.

The power management module 295 may manage electric power supplied to the electronic device 201. The power management module 295 may include a power management integrated circuit (PMIC), a charger IC, a battery gauge, etc.

The PMIC may be implemented in the form of an IC chip or SoC. Charging electric power may be performed in wired and/or wireless modes. The charger IC may charge a battery, and prevent input over-voltage or input over-current to the battery from a charger. The charger IC may be implemented with a wired charging type and/or a wireless charging type. Examples of the wireless charging type of the charger IC are a magnetic resonance type, a magnetic induction type, an electromagnetic type, an acoustic type, etc. If the charger IC is implemented with a wireless charging type, it may also include an additional circuit for wireless charging, e.g., a coil loop, a resonance circuit, a rectifier, etc.

The battery gauge may measure a residual charge amount of the battery 296, a level of voltage, a level of current, a temperature during the charge, etc. The battery 296 stores electric power and supplies it to the electronic device 201. The battery 296 may include a rechargeable battery or a solar battery.

The indicator 297 may show states of the electronic device 201 or of the parts thereof (e.g., the AP 210), e.g., a booting state, a message state, a recharging state, and the like. The motor 298 converts an electrical signal into a mechanical vibration. The electronic device 201 may include a processor for supporting a mobile TV, e.g., a GPU.

The mobile TV supporting processor may process media data that complies with standards of digital multimedia broadcasting (DMB), digital video broadcasting (DVB), Mediaflo™, etc.

Each of the elements/units of the electronic device according to an embodiment of the present disclosure may be implemented with one or more components, and may be called different names according to the type of the electronic device. The electronic device may include at least one element described above. The electronic device may also be modified in such a way as to remove part of the elements or include additional elements. In addition, the electronic device may also be modified such that parts of the elements are integrated into one entity that performs their original functions.

Herein, the term 'module' refers to a 'unit' including hardware, software, firmware or a combination thereof. The term 'module' may be interchangeably used with the terms 'unit', 'logic', 'logical block', 'component', 'circuit', etc. A 'module' may be the least identifiable unit or part of an integrated component. A 'module' may also be the least unit or part thereof that may perform one or more functions of the module. A 'module' may be implemented through mechanical or electronic modes. For example, 'modules' according to an embodiment of the present disclosure may be implemented with at least one of an application specific integrated circuit (ASIC) chip, a field programmable gate array (FPGAs) and a programmable logic device that may perform functions that are known or will be developed.

Figure 3:
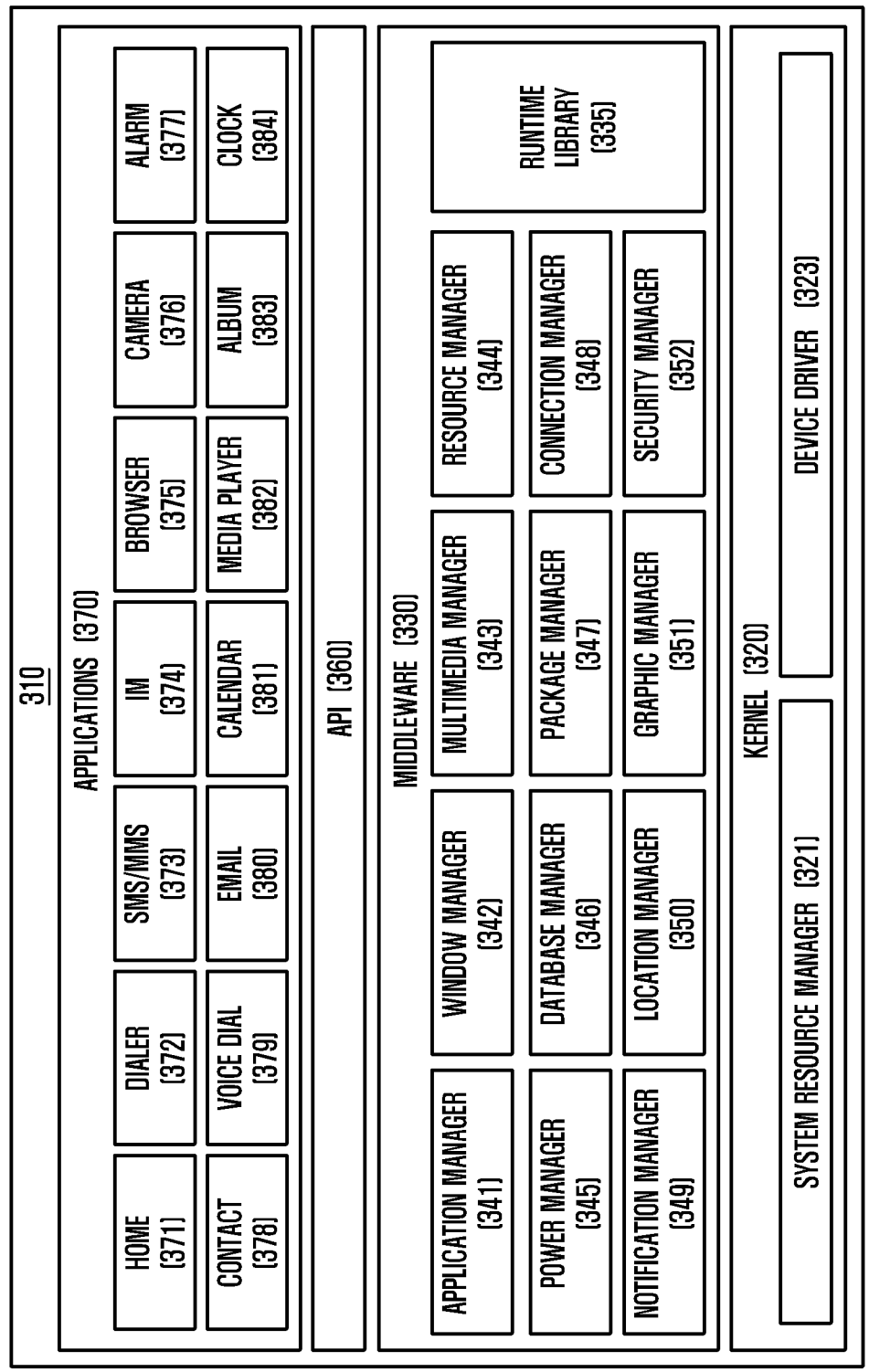
FIG. 3 is a block diagram of a program module according to an embodiment of the present disclosure.

FIG. 3 is a block diagram of a program module according to an embodiment of the present disclosure.

Referring to FIG. 3, a program module 310 may include an operating system (OS) for controlling resources related to the electronic device and/or various applications executed in the operating system. The OS may be, for example, Android™, iOS™ Windows™, Symbian®, Tizen®, Bada®, and the like.

The program module 310 includes a kernel 320, middleware 330, an API 360, and applications 370. At least some of the program module 310 may be preloaded on an electronic device, or may be downloaded from an external electronic device, or a server.

The kernel 320 includes a system resource manager 321 and a device driver 323. The system resource manager 321 may perform control, allocation, retrieval, etc., of system resources. The system resource manager 321 may include a process manager, memory manager, file system manager, etc. The device driver 323 may include a display driver, camera driver, BT driver, shared memory driver, USB driver, keypad driver, Wi-Fi driver, audio driver, or interprocess communication (IPC) driver.

The middleware 330 may provide a function required by the applications 370 in common, or provide various functions to the applications 370 through the API 360 such that the applications 370 may efficiently use the limited system resources within the electronic device. The middleware 330 includes a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform I/O management, memory management, functionality for an arithmetic function, etc.

The application manager 341 may manage a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (e.g., codec) appropriate for the corresponding format. The resource manager 344 may manage resources such as source code, memory, and storage space of at least one of the applications 370.

The power manager 345 may operate together with a basic input/output system (BIOS) to manage a battery or other power sources, and may provide power information required for the operation of the electronic device. The database manager 346 may generate, search for, and/or change a database to be used by at least one of the applications 370. The package manager 347 may manage the installation or update of an application distributed in the form of a package file.

The connection manager 348 may manage a wireless connection such as, for example, Wi-Fi or BT. The notification manager 349 may display or notify of an event, such as an arrival message, appointment, proximity notification, etc., in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, etc. When the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide the required functions. In addition, the middleware 330 may dynamically delete some of the existing elements, or may add additional elements as required.

The API 360 is, for example, a set of API programming functions, and may be provided with a different configuration according to an OS being ran on the electronic device. For example, in the case of Android™ or iOS™, one API set may be provided for each platform. In the case of Tizen™, two or more API sets may be provided for each platform.

The applications 370 includes a home application 371, a dialer application 372, an SMS/MMS application 373, an instant message application (IM) 374, a browser application 375, a camera application 376, alarm 377, a contacts application 378, a voice dialer 379, an email application 380, a calendar application 381, a media player application 382, an album 383 application, a clock 384 application, healthcare application (e.g., an application that measures exercise quantity or blood sugar level), and an environment information (e.g., an application that measures atmospheric pressure, humidity, or temperature information).

The applications 370 may include an information exchange application supporting information exchange between the electronic device and an external electronic device. The information exchange application may include a notification relay application for transferring specific information to an external electronic device or a device management application for managing an external electronic device.

The notification relay application may include a function for transferring, to the external electronic device, notification information generated from other applications of the electronic device (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update) at least one function of an external electronic device communicating with the electronic device (e.g., a function of turning on/off the external electronic device or some components thereof, or a function for adjusting luminance or a resolution of the display), applications operating in the external electronic device, or services provided by the external electronic device (e.g., a call service and a message service).

The applications 370 may include an application (e.g., a healthcare application of a mobile medical device) designated according to an attribute of the external electronic device. The applications 370 may include an application received from a server, or an external electronic device. The applications 370 may include a preloaded application or a third party application which may be downloaded from the server. Names of the elements of the program module 310, according to the above-described embodiments of the present disclosure, may change depending on the type of OS.

Figure 4:
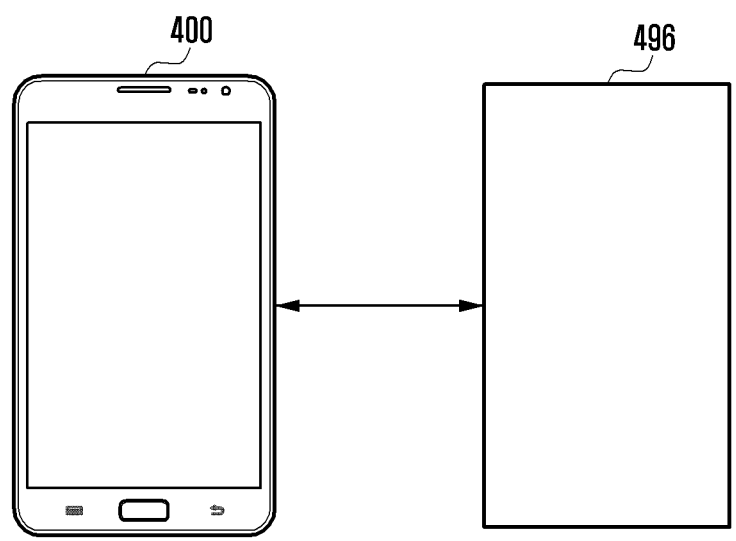
FIG. 4 is a block diagram illustrating a correlation between an electronic device and a battery according to an embodiment of the present disclosure.
Figure 5A:
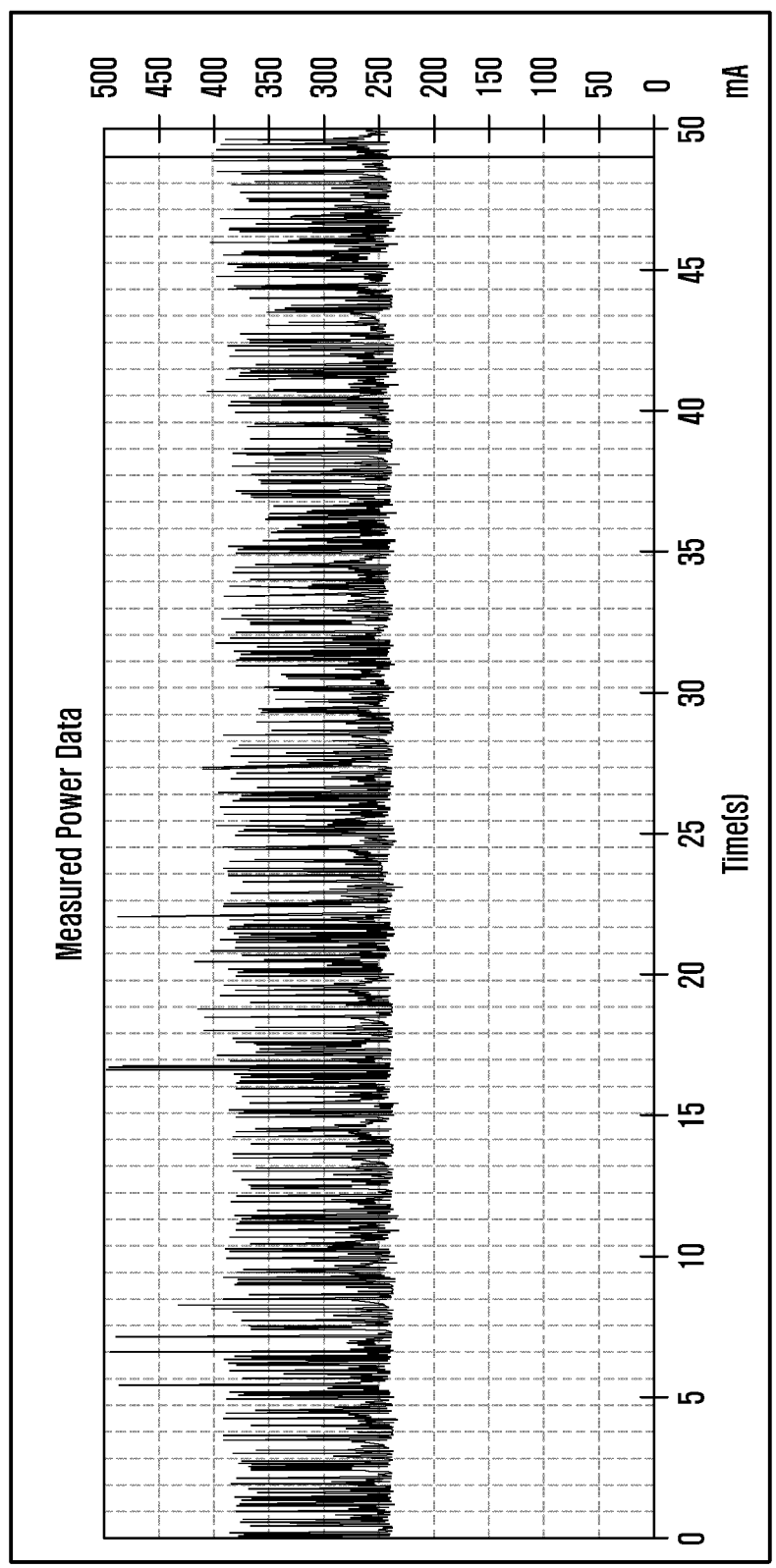
FIG. 5A is a graph of an amount of current consumption in an electronic device to which the related art is applied.
Figure 5B:
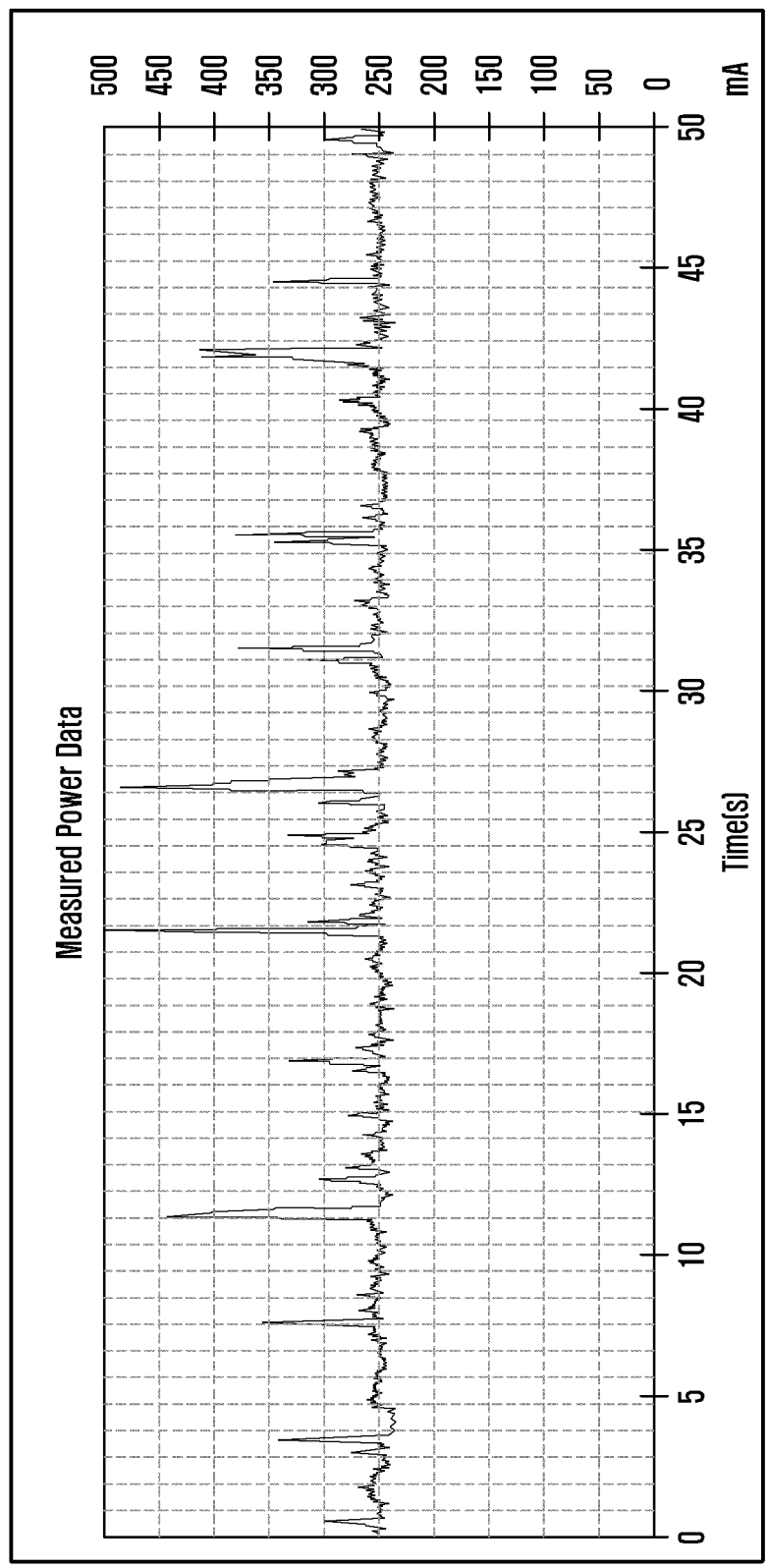
FIGS. 5B to 5C are graphs of current consumption depending on identification of data usage according to an embodiment of the present disclosure.
Figure 5C:
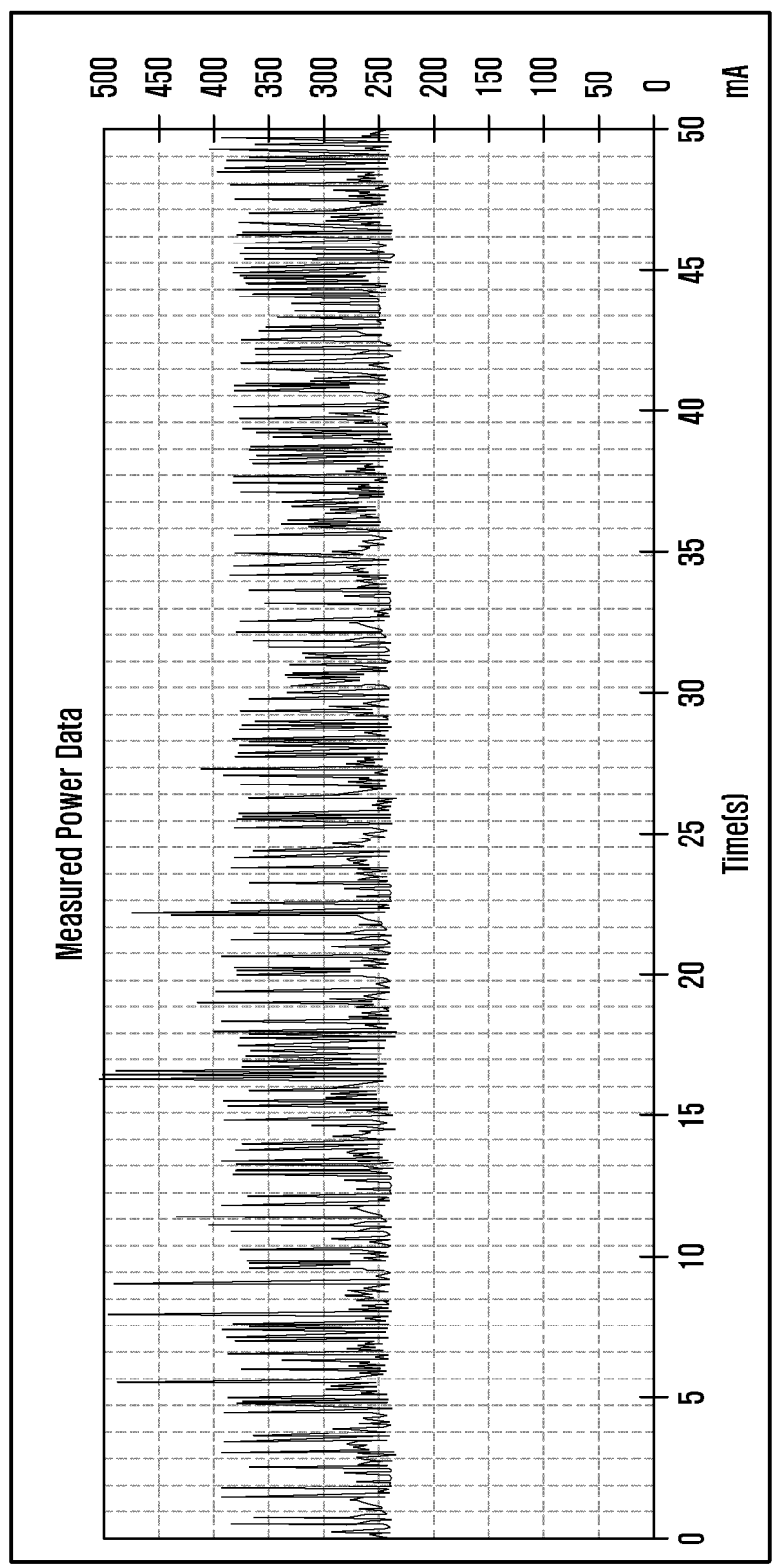

FIG. 4 is a block diagram illustrating a correlation between an electronic device and a battery according to an embodiment of the present disclosure. FIG. 5A is a graph of an amount of current consumption in an electronic device to which the related art is applied. FIGS. 5B to 5C are graphs of current consumption depending on identification of data usage according to an embodiment of the present disclosure;

Referring to FIG. 4, an electronic device 400 includes a battery 49. The electronic device 400 may be supplied with power required for the operation of the electronic device 400 from the battery 496.

The overall operation of the electronic device 400 may be performed with the capacity of the battery 496 which has a finite ability to supply current. Since the amount of current consumed in the electronic device 400 is increased when the electronic device 400 identifies the data usage, a method for minimizing current consumption may be necessary.

FIG. 5A is a graph showing the measurement of the amount of current consumed in the electronic device to which the related art is applied, and FIGS. 5B and 5C are graphs showing the measurement of the amount of current consumed in the electronic device to which a technique of the present disclosure is applied.

FIGS. 5A to 5C are graphs measured based on the same transmission rate. For example, the transmission rate may be assumed to be 94.5 Mbps (megabits per second).

FIG. 5A is a graph showing the measurement of the current consumption by a conventional electronic device.

Referring to FIG. 5A, the total data usage may be identified each time the data usage reach 2 MB which is a fixed value. The conventional electronic device may take about 0.18 seconds to transceive data of 2 MB when transceiving data at a rate of 94.5 Mbps. The electronic device may identify the total data usage once every about 0.178 seconds. Power consumption of about 400 mA is performed once every about 0.178 seconds. For example, the electronic device may identify data usage once every 0.18 seconds until the data usage reach the limited data usage reference amount.

FIGS. 5B and 5C are graphs showing the measurement of the amount of current consumed in the electronic device to which a technique of the present disclosure is applied.

When the value calculated based on the total data usage satisfies the first condition, the electronic device may identify the total data usage each time the data usage reaches the reference amount corresponding to the first condition. Until the value calculated based on the total data usage satisfies the second condition, the electronic device may identify the total data usage each time the data usage reaches the reference amount corresponding to the first condition. If the value calculated based on the total data usage satisfies the second condition, the electronic device may change the value to the reference amount corresponding to the second condition and may identify the total data usage each time the data usage reaches the changed reference amount.

For example, in FIG. 5B, it may be assumed that the value calculated based on the total data usage satisfies the first condition and the reference amount corresponding to the first condition is 500 MB. When data is transceived at a rate of 94.5 Mbps under the same data rate condition as the graph of FIG. 5A, it may take about 4 seconds to transceive 50 MB of data. The electronic device may identify the total data usage once every about 4.4 seconds. In FIG. 5B, power consumption of about 400 mA is performed once every about 4.4 seconds.

If it is determined that the total data usage that has been identified each time the data usage reaches 50 MB satisfies the second condition, the reference amount for identifying the data usage may be changed. For example, the total data usage may be identified each time the data usage reaches 4 MB which is the reference amount by changing the reference amount from 50 MB to 4 MB. It may take about 0.37 seconds to transceive 4 MB of data. The electronic device may identify the total data usage once every about 0.37 seconds. In FIG. 5C, power consumption of about 400 mA is performed once every about 0.37 seconds.

Referring to FIGS. 5B and 5C, the electronic device may identify the data usage once every 4 seconds until the data usage reaches a predetermined data use limit value or a data use warning value, and then, change the data usage to identify the data usage once every 0.37 seconds depending on the total data usage.

Compared with the related art which identifies the data usage using a fixed value, power consumption is reduced due to the identification of the data usage by changing the reference amount for identifying the data usage based on the total data usage.

Figure 6:
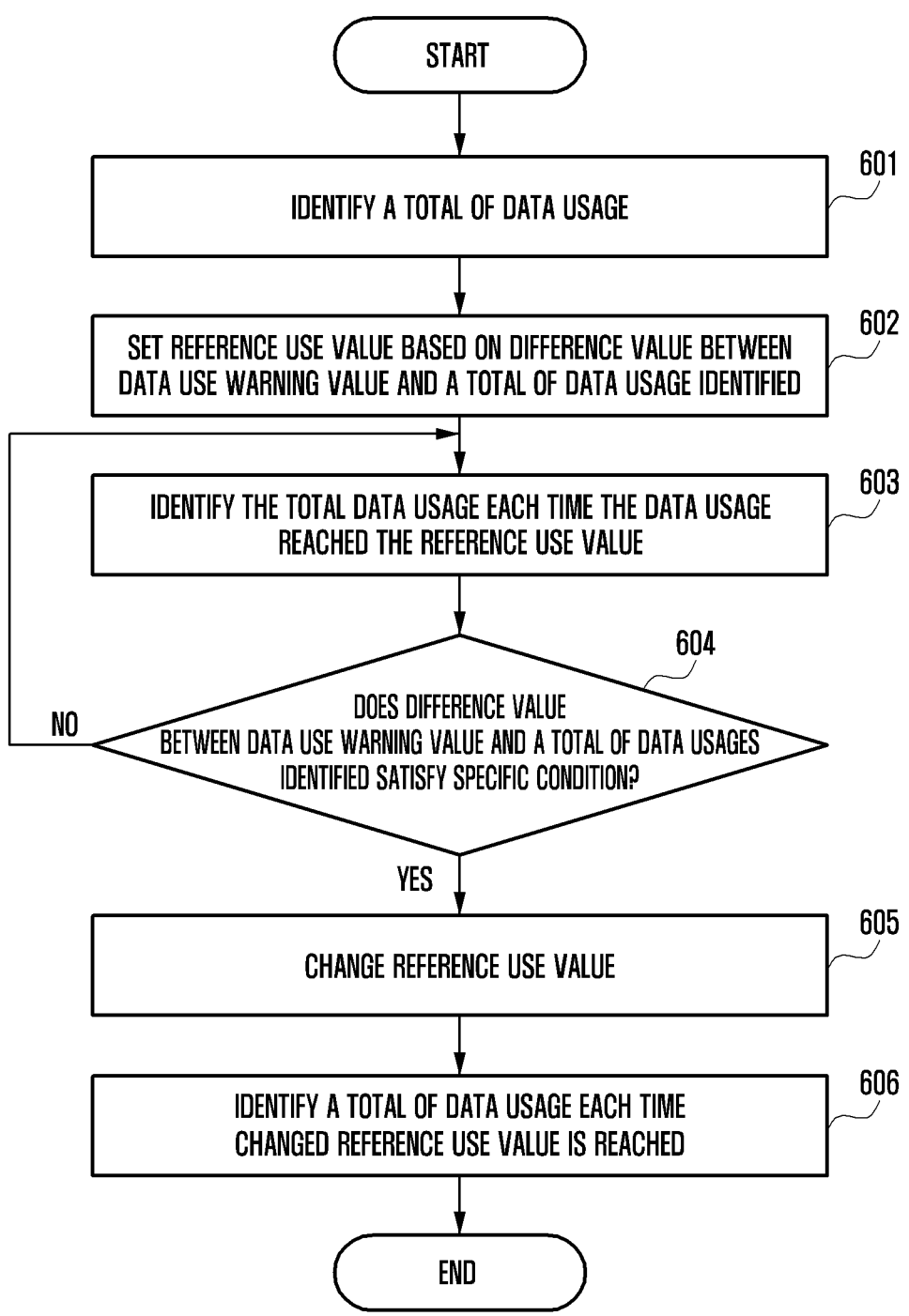
FIG. 6 is a flowchart illustrating an operation of identifying data usage according to an embodiment of the present disclosure

FIG. 6 is a flowchart illustrating an operation of identifying data usage according to an embodiment of the present disclosure.

Figure 7A:
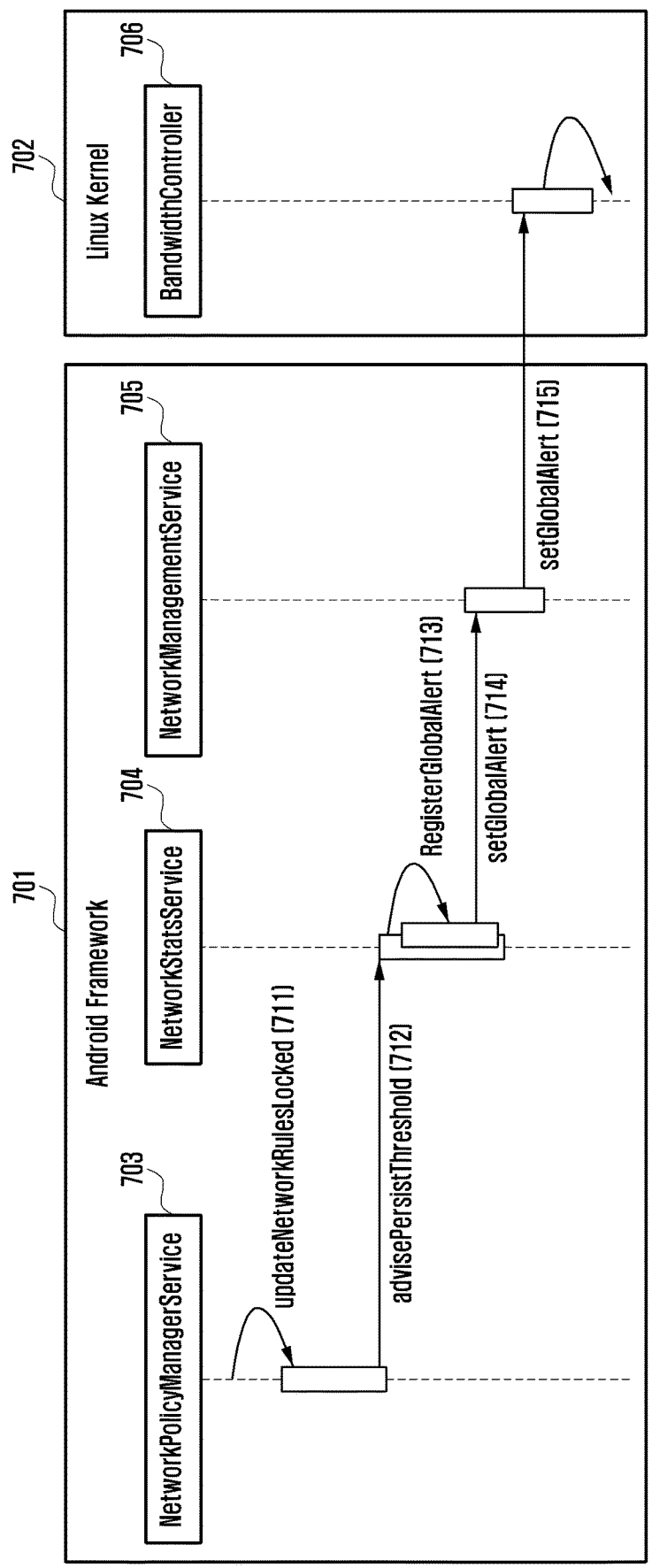
FIGS. 7A to 7C are flowcharts illustrating an operation of identifying data usage according to an embodiment of the present disclosure.
Figure 7B:
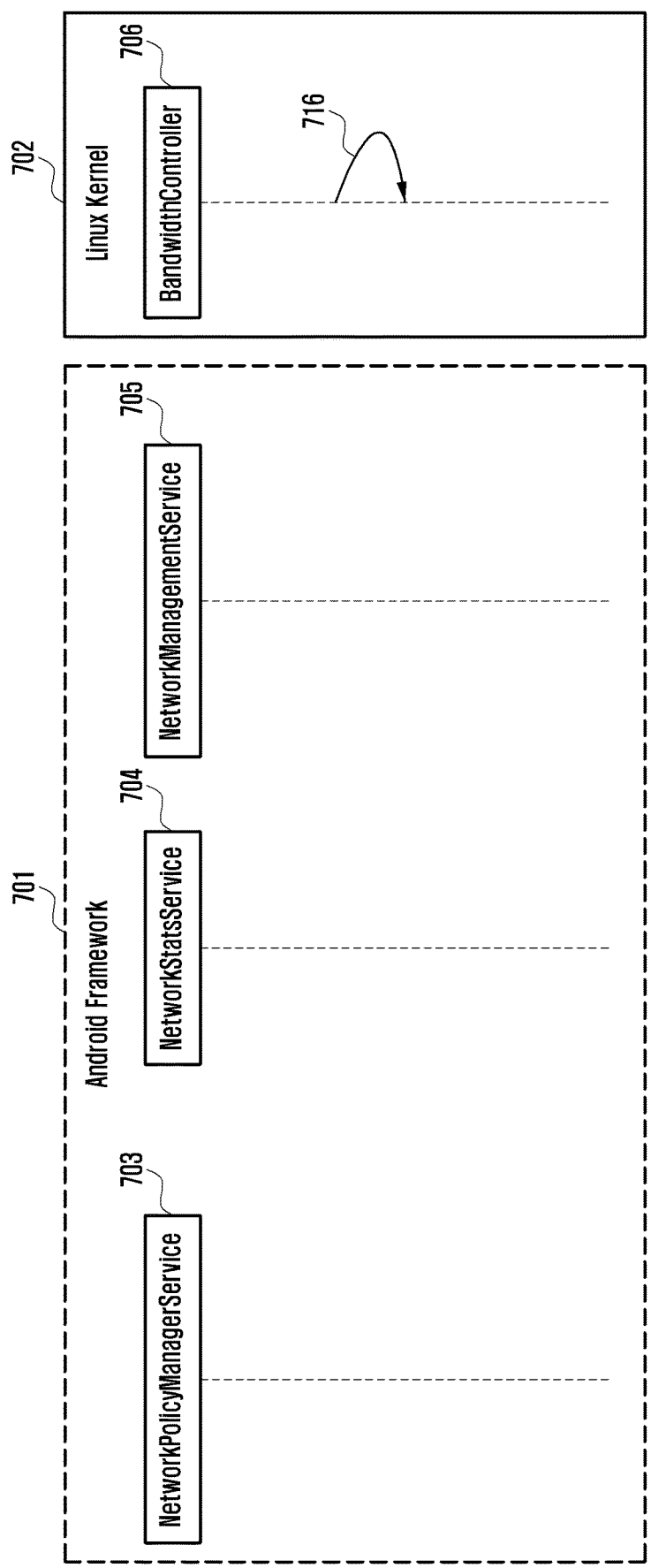
Figure 7C:
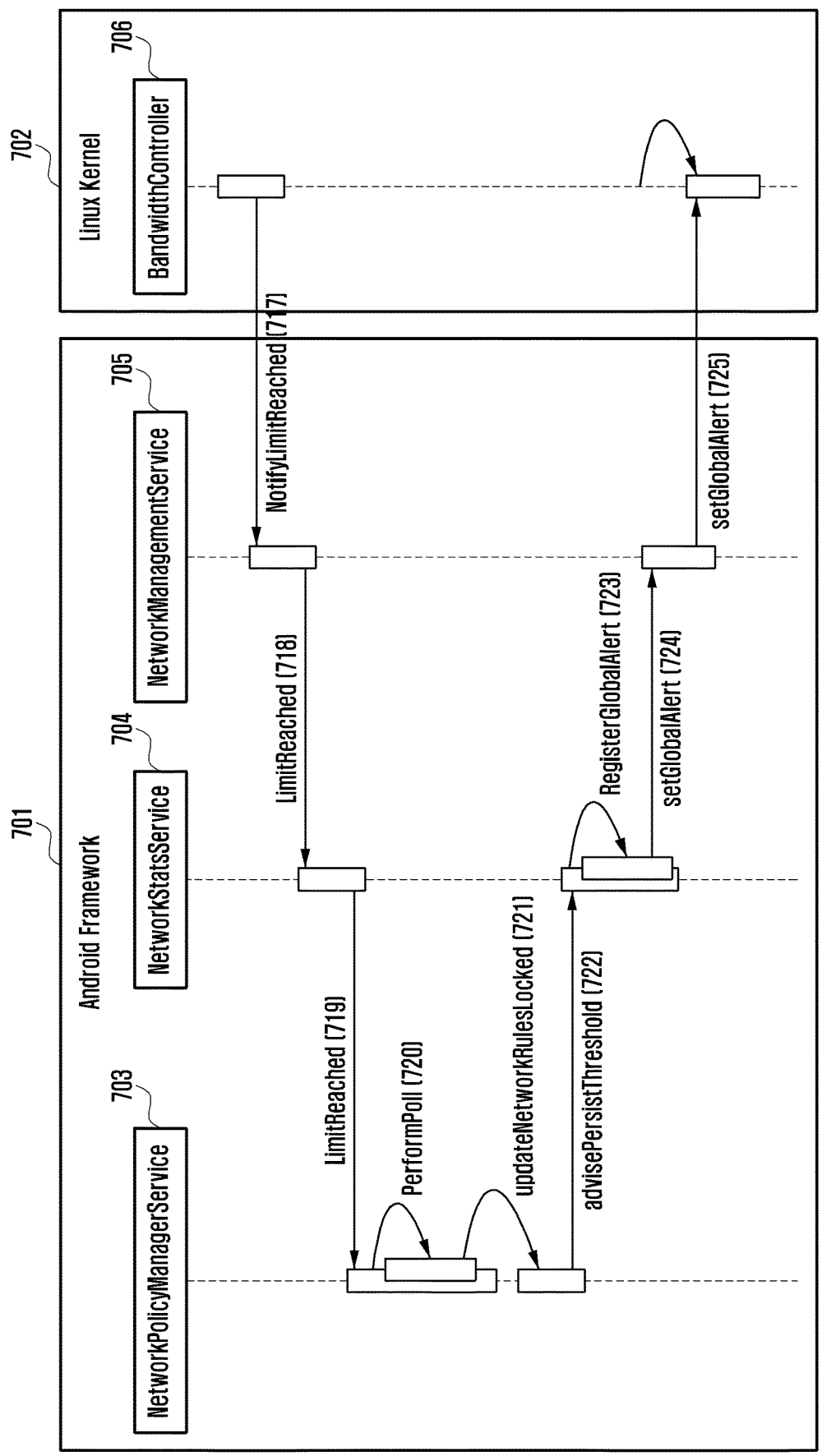

FIGS. 7A to 7C are diagrams illustrating an operation of identifying data usage according to an embodiment of the present disclosure.

Specifically, FIGS. 7A to 7C illustrate an operation between an Android framework 701 and a Linux kernel 702 of an electronic device.

In FIGS. 7A to 7C, the Android framework 701 and the Linux kernel 702 may be included, in which the Android framework 701 may include a network policy manager service (NetworkPolicyManagerService) 703, a network statistics service (NetworkStatsService) 704, and a network management service (NetworkManagementService) 705. The network policy manager service (NetworkPolicyManagerService) 703 may provide a service for maintaining a low-level network policy rule, and the network policy manager service (NetworkPolicyManagerService) 703 may use statistical data from a network statistics service (NetworkStatsService) 704 to operate the rule. The network statistics service (NetworkStatsService) 704 may collect detailed network statistical data and provide data to other system services. The network management service (NetworkManagementService) 705 may monitor the Linux kernel 702.

The Linux kernel 702 may include a bandwidth controller 706, and the bandwidth controller 706 may provide a notification indicating when data is used by a value received through a network management service (NetworkManagementService) 705 of the Android framework 701.

Referring to FIG. 6, at step 601, the electronic device identifies the total data usage.

At step 602, the electronic device sets a reference use value for identifying the data usage based on the difference value between the data use warning value and the identified data usage. The data use warning value may be a reference value at which the electronic device displays a warning notification to a user using the electronic device about the data usage of the electronic device. The warning notification may include displaying warning signs on the screen of the electronic device. The data use warning value may be set by the user. In addition, the data use warning value may be a predetermined value set by the electronic device's manufacturer.

$$X = (\text{data use warning value} - \text{data usage})/k \quad (1)$$

In the above Equation (1), k is an arbitrary value and is assumed to be 2. The above Equation (1) may be stored in a memory (e.g., memory 130) of the electronic device. The reference use value may be set to be 50 MB when X calculated by the above Equation (1) is greater than or equal to 50 MB, and may be changed when X is less than 50 MB, and may be set to be a minimum of 128 kB. For example, when X is greater than or equal to 50 MB it may be assumed to be a first condition, and the reference use value may be 50 MB. When X is greater than or equal to 128 kB and is less than 50 MB it may be assumed to be a second condition, and the reference use value may be the X value itself. When X is less than 128 kB may be assumed to be a third condition, and the reference use value may be 128 kB. The above-mentioned numerical values and conditions are merely one example, and the present disclosure is not limited thereto.

It may be assumed that the data warning value is 2 GB (2000 MB) and the total data usage is 1.8 GB (1800 MB). At this time, if the k value is assumed to be 2, the X value may be 100 MB based on Equation (1). Since the calculated value X satisfies the first condition, the electronic device may be set to be 50 MB as the reference use value corresponding to the first condition. For example, if the data warning value is 2 GB and the total data usage is between 0 MB and 1900 MB, the reference use value may be set to 50 MB.

Referring to FIG. 7A, the network policy manager service 703 of the Android framework 701 of the electronic device may calculate the difference value between the data use warning value (step 711: updateNetworkRulesLocked) and the identified data usage, and determine based on the reference use value to be registered in the Linux kernel 702 based on the calculated difference value (step 712: advisePersistThreshold). The determined reference use value may be transferred from the network policy manager service 703 to the network statistics service 704 (step 713: RegisterGlobalWarning) and may also be transferred to the network management service 705 (step 714: setGlobalWarning). The determined reference use value may be transferred from the network management service 705 to the bandwidth controller 706 of the Linux kernel 702 (step 715: setGlobalWarning). For example, the reference use value may be transferred to a resident program (e.g., daemon) located in the Linux kernel 702 when transferred from the network management service 705 to the Linux kernel 702. The resident program may be a program executed while operating works associated with an operation in a background state, and may be automatically operated to perform the necessary works if works condition to be processed occur.

Referring again to FIG. 6, at step 603, the electronic device identifies the total data usage each time the data usage reaches the reference use value. The electronic device may identify the total data usage each time 50 MB is used. For example, after 50 MB which is the reference use value when the data usage is 1800 MB, the total data usage may be identified. The total data usage that is actually identified may be a value somewhat exceeding 1850 MB.

Referring to FIG. 7B, the bandwidth controller 706 of the Linux kernel 702 of the electronic device may identify whether the data is used by the reference use value received from the Android framework 701 (step 716). The Android framework 701 of the electronic device may be in a standby state before it receives a notification from the Linux kernel 702 indicating that the data is used by the reference use value.

Referring again to FIG. 6, at step 604, the electronic device determines whether specific conditions are satisfied based on the difference value between the data use warning value and the identified data usage.

The specific conditions may be the first condition, the second condition, or the third condition as assumed above, as conditions for changing the reference use value. The electronic device may change the reference use value from 50 MB, which is the reference use value corresponding to the first condition, to the reference use value corresponding to the second condition if the calculated X satisfies the second condition.

If the specific condition, e.g., the second condition is satisfied at step 604, the reference use value is changed at step 605. At step 606, the total data usage is identified each time the data usage reaches the changed reference use value.

For example, if the total data usage is 1.95 GB (1950 MB), then the X value may be 25 MB. Because the second condition is satisfied, the reference use value may be changed from 50 MB, which is the reference use value corresponding to the first condition, to 25 MB which is the reference use value corresponding to the second condition. For example, if the data warning value is 2 GB and the total data usage exceeds 1950 MB and is less than 1999.744 MB, the reference use value may be set to be the calculated X value.

Referring to FIG. 7C, the Linux kernel 702 may notify the Android framework 701 that the data is used by the reference use value (step 717: notifyLimitReached). The network manager service 705 of the Android framework 701 may receive the notification and transfer the notification to the network statistics service 704 (step 718: LimitReached). The network statistics service 704 may transfer the received notification to the network policy manager service 703 (step 719: LimitReached) and the network policy manager service 703 may identify the actual data usage, for example, the total data usage (step 720: PerformPoll).

The network policy manager service 703 may calculate the difference value between the data use warning value (step 721: updateNetworkRulesLocked) and the total data usage, and determine based on the reference use value to be registered in the Linux kernel 702 based on the calculated difference value (step 722: advisePersistThreshold). In the determining process, the network policy manager service 703 may use the determined reference use value based on the difference value between the data use warning value and the identified data usage, which is different from the previously determined reference use value. For example, the reference use value may be changed. The changed reference use value may be transferred from the network policy manager service 703 to the network statistics service 704 (step 723: RegisterGlobalAlert) and may also be transferred to the network management service 705 (step 724: setGlobalAlert). The changed reference use value may be transferred from the network management service 705 to the bandwidth controller 706 of the Linux kernel 702 (step 725: setGlobalAlert). For example, the reference use value may be transferred to a resident program (e.g., daemon) located in the Linux kernel when transferred from the network management service 705 to the Linux kernel 702. The resident program may be a program executed while operating works associated with an operation in a background state, and may be automatically operated to perform the necessary works if works condition to be processed occur. The Android framework 701 of the electronic device may be in a standby state before it receives a notification from the Linux kernel 702 indicating that the data is used by the changed reference use value.

Figure 8:
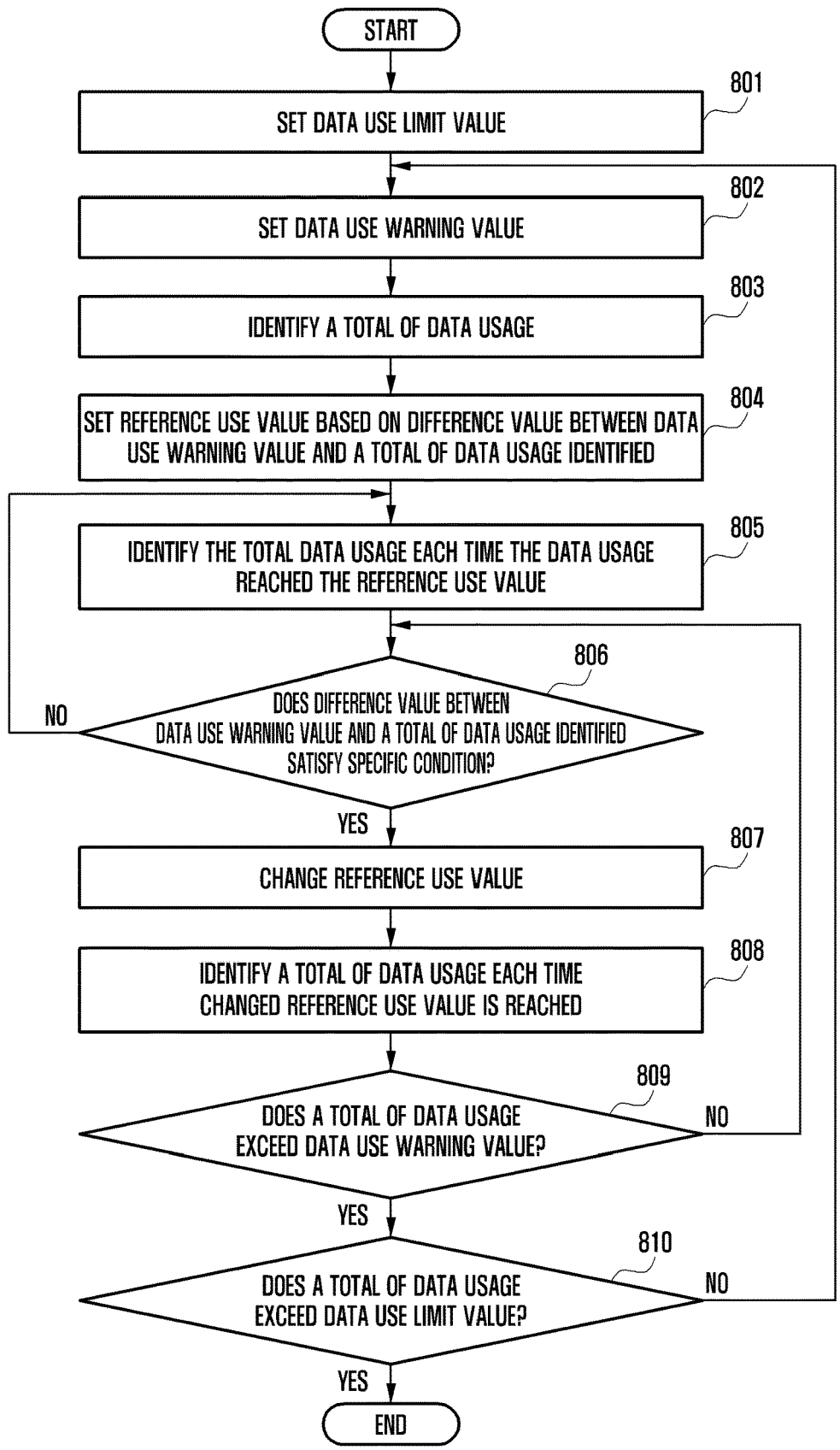
FIG. 8 is a flowchart illustrating an operation of identifying data usage according to an embodiment of the present disclosure

For example, the total data usage may be identified each time the reference use value corresponding to the second condition is used. The total data usage identified may be 1999.750 MB. In this case, since the calculated X value is 125 kB, the third condition may be satisfied. That is, the electronic device may change from the reference use value corresponding to the second condition to the reference use value corresponding to the third condition in order to identify the total data usage. For example, if the data warning value is 2 GB and the total data usage is greater than or equal to 1999.744 MB, the reference use value may be set to 128 kB. Thereafter, the electronic device may identify the total data usage each time the changed reference use value of 128 kB is used. FIG. 8 is a flowchart showing an operation of identifying data usage according to various embodiments of the present disclosure.

Referring to FIG. 8, at step 801, the electronic device sets the data use limit value. The data use limit value may be a reference value at which a user limits the use of data. The data use limit value may be set by the user. In addition, the data use limit value may be a predetermined value set by the manufacturer of the electronic device. When the data use limit value is reached, the electronic device may stop the operation that uses data.

At step 802, the electronic device sets the data use warning value. The data use warning value may be a reference value at which the electronic device displays a warning notification to a user using the electronic device about the data usage of the electronic device. The warning notification may include displaying warning signs on the screen of the electronic device. The data use warning value may be set by the user. In addition, the data use warning value may be a predetermined value set by the manufacturer of the electronic device. The data use limit value may be greater than the data use warning value.

At step 803, the electronic device identifies the total data usage.

At step 804, the electronic device sets the reference use value based on the difference value between the data use warning value and the identified data usage.

The reference use value may be set to be 50 MB when X calculated by Equation 1 is greater than or equal to 50 MB, and may be changed when X is less than 50 MB, and may be set to be a minimum of 128 kB. For example, when X is greater than or equal to 50 MB it may be assumed to be a first condition, and the reference use value may be 50 MB. When X is greater than or equal to 128 kB and less than 50 MB may be assumed to be a second condition, and the reference use value may be the X value itself. When X is less than 128 kB may be assumed to be a third condition, and the reference use value may be 128 kB.

At step 805, the electronic device identifies the total data usage each time the data usage reaches the reference use value.

For example, assuming that the data warning value is 2 GB (2000 MB) and the total data usage is 1.8 GB (1800 MB), if the k value is 2, the X value may be 100 MB based on the Equation 1. Because the calculated value X satisfies the first condition, the electronic device may set the reference use value to be 50 MB. That is, if the data warning value is 2 GB and the total data usage is between 0 MB and 1900 MB, the reference use value may be set to be 50 MB.

At step 806, the electronic device determines that the specific condition is satisfied based on the difference value between the data use warning value and the identified data usage. The specific conditions may be the first condition, the second condition, and/or the third condition as conditions for changing the reference use value. The electronic device may change the reference use value from 50 MB, which is the reference use value corresponding to the first condition, to the reference use value corresponding to the second condition if the calculated X satisfies the second condition.

As the determination result in step 806, if the specific condition, e.g., the first condition satisfied, the step 805 may be performed again. As the determination result in step 806, if the specific condition, e.g., the second condition is satisfied, step 807 may be performed.

At step 807, the electronic device changes the previous reference use value to the reference use value corresponding to the second condition. At step 808, the electronic device identifies the total data usage each time the data usage reaches the changed reference use value. For example, if the total data usage is 1.95 GB (1950 MB), then the X value may be 25 MB. Because the second condition is satisfied, the reference use value may be changed from 50 MB to 25 MB. If the data warning value is 2 GB and the total data usage exceeds 1950 MB and is less than 1999.744 MB, the reference use value may be set to be the calculated X value.

At step 809, the electronic device determines whether the total data usage exceeds the data use warning value. If not, the process may be repeated by proceeding to the step 806.

For example, by proceeding to the step 806, if the total data usage identified is 1999.750 MB, the calculated X value is 125 kB, and the third condition may be satisfied. By proceeding to the step 807, the electronic device may change from the reference use value corresponding to the second condition to the reference use value corresponding to the third condition in order to identify the total data usage. For example, if the data warning value is 2 GB and the total data usage is greater than or equal to 1999.744 MB, the reference use value may be set to be 128 kB.

At step 808, the electronic device identifies the total data usage each time the changed reference use value of 128 kB is used. The total data usage that is actually identified may be a value somewhat exceeding 1,999.878 MB.

As the determination result in step 809, if it is determined that the total data usage exceeds the data use warning value, the process proceeds to step 810 to determine whether the total data usage exceeds the data use limit. As the determination result in step 810, if the total data usage does not exceed the data use limit, the process returns to the step 802, such that the data use warning value may be reset. As the determination result in step 810, if the total data usage exceeds the data use limit, the process may terminate.

Figure 9A:
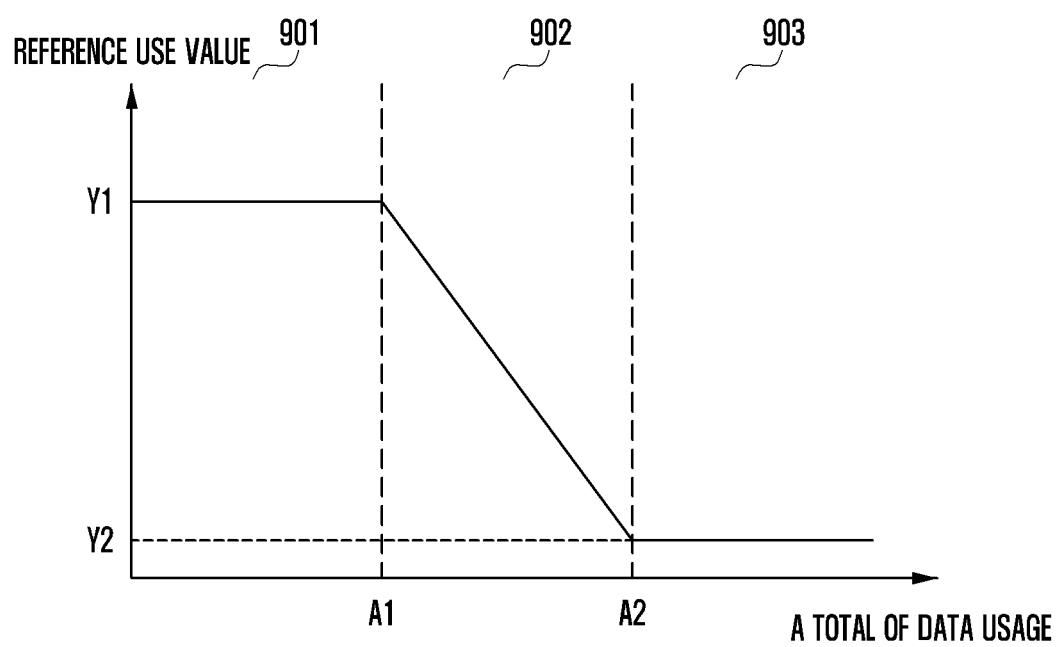
FIGS. 9A to 9C are graphs of a change in a reference use value depending on data usage according to an embodiment of the present disclosure.
Figure 9B:
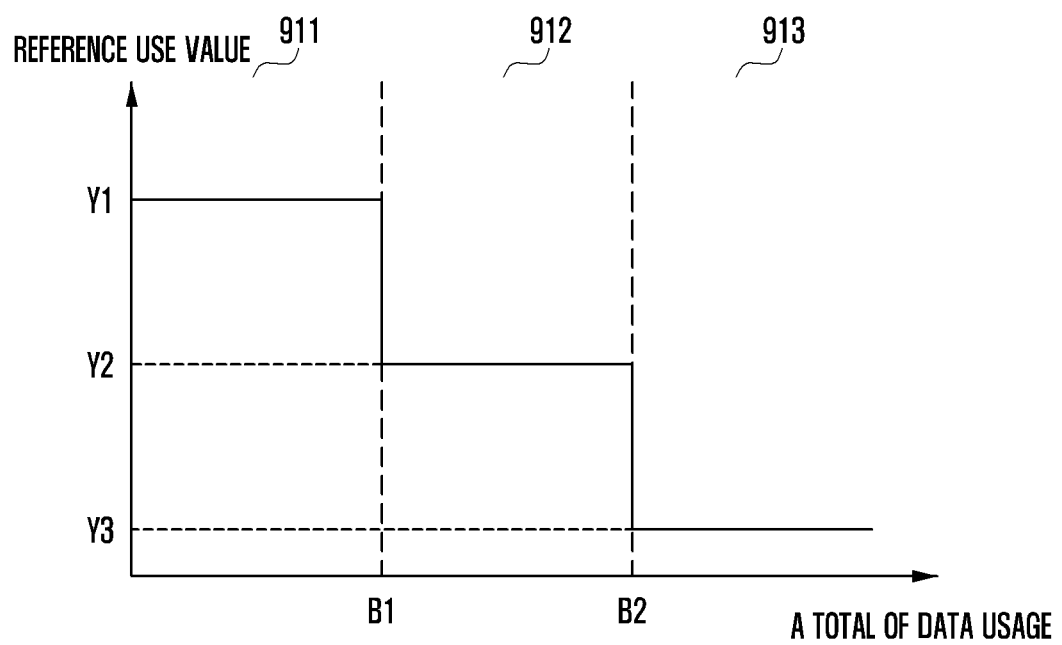
Figure 9C:
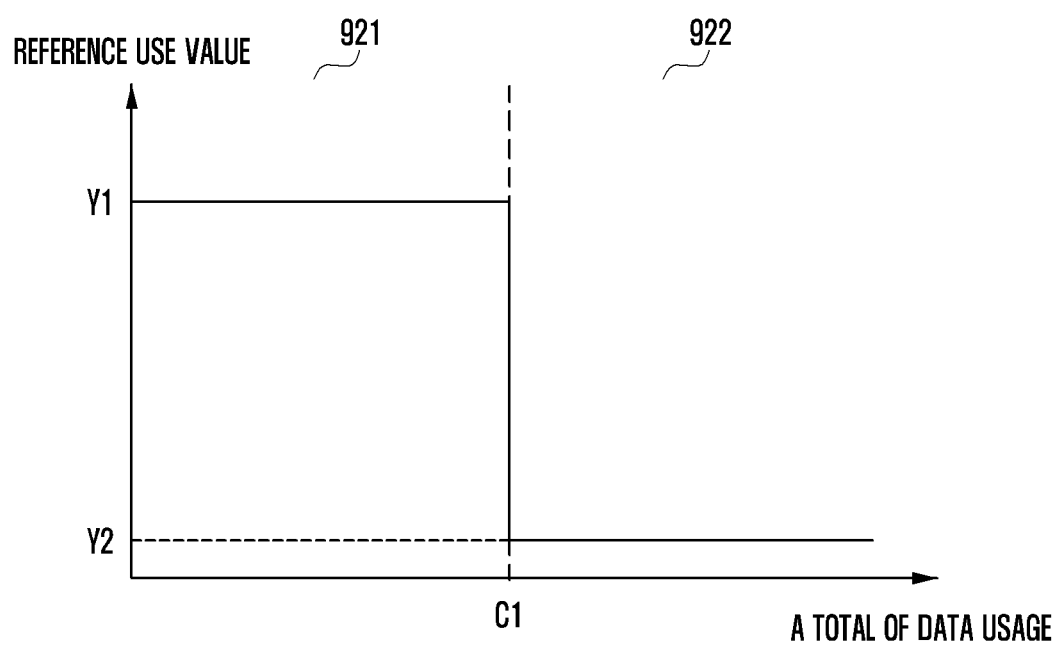

FIGS. 9A to 9C are graphs showing changes in a reference use value depending on the data usage according to an embodiment of the present disclosure.

In Equation 1, since the data warning value and the k value are fixed values, the reference use value may be set depending on the value of the data usage.

Referring to FIGS. 9A to 9C, the change in the reference use value depends on the total data usage. The unit of the total data usage and the reference use value may be megabytes (MB).

Referring to FIG. 9A, the reference use value of the electronic device may be set to be value Y1 if the total data usage is less than A1, and may be set to be the value calculated based on Equation 1 if the total data usage is greater than or equal to value A1 and less than value A2. In addition, if the total data usage is greater than or equal to the A2, it may be set to be value Y2. Based on the previous embodiments, the Y1 may be 50 MB and the Y2 may be 128 MB (128,000 kB). The A1 may be 1900 MB based on Equation 1, and the A2 may be 1999.744 MB.

The reference use value for identifying the total data usage may be set to be the value Y1 just before the total data usage reaches the value A1. The reference use value for identifying the total data usage until the total data usage reaches the value A2 after reaching the value A1 may be set to be the value calculated from Equation 1. If the total data usage reaches the value A2, the reference use value for identifying the total data usage may be set to be the value Y2.

In FIG. 9A, the first condition corresponds to an interval 901, and the reference use value corresponding to the first condition may be the value Y1. The second condition corresponds to an interval 902, and the reference use value corresponding to the second condition may be a value calculated depending on Equation 1. The third condition corresponds to an interval 903, and the reference use value corresponding to the third condition may be the value Y2.

Referring to FIG. 9B, the reference use value of the electronic device is set to be the value Y1 if the total data usage is less than B1, and may be set to be the value Y2 if the total data usage is greater than or equal to value B1 and is less than value B2. In addition, if the total data usage is greater than or equal to the B2, it may be set to be value Y3.

As the first condition, the reference use value for identifying the total data usage may be set to be the value Y1 just before the total data usage reaches the value B1. As the second condition, the reference use value for identifying the total data usage may be set to be the value Y2 before the total data usage reaches the value B2 after reaching the value B1. As the third condition, if the total data usage reaches the value B2, the reference use value for identifying the total data usage may be set to be the value Y3.

In the graph of FIG. 9B, the first condition corresponds to an interval 911, and the reference use value corresponding to the first condition may be the value Y1. The second condition corresponds to an interval 912, and the reference use value corresponding to the second condition may be the value Y2. The third condition corresponds to an interval 913, and the reference use value corresponding to the third condition may be the value Y3.

Referring to FIG. 9C, the reference use value of the electronic device is set to be the value Y1 if the total data usage is less than C1, and may be set to be the value Y2 if the total data usage is greater than or equal to value C1. For example, as the first condition, the reference use value for identifying the total data usage may be set to be the value Y1 before the total data usage reaches the value C1. As the second condition, if the total data usage reaches the value C1, the reference use value for identifying the total data usage may be set to be the value Y2.

In FIG. 9C, the first condition corresponds to an interval 921, and the reference use value corresponding to the first condition may be the value Y1. The second condition corresponds to an interval 922, and the reference use value corresponding to the second condition may be the value Y2.

Figure 10:
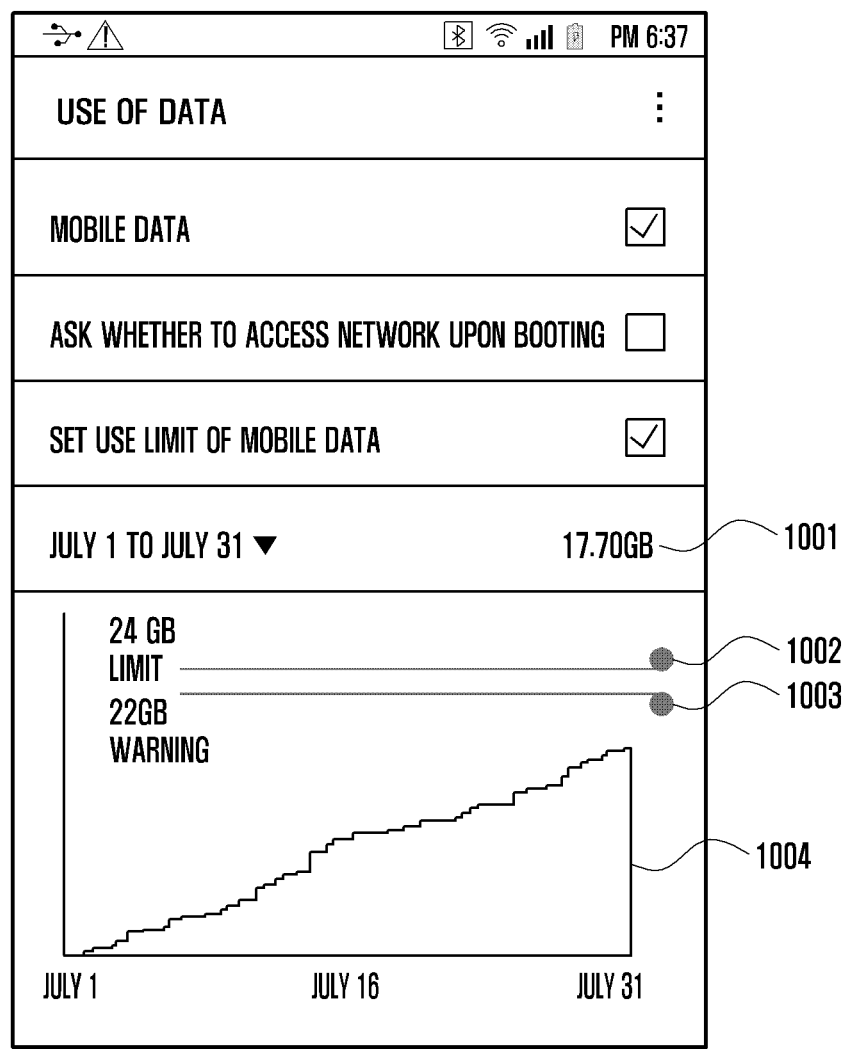
FIG. 10 illustrates a user interface according to an embodiment of the present disclosure.

FIG. 10 is illustrates a user interface according to an embodiment of the present disclosure.

Referring to FIG. 10, the electronic device may be the user interface for receiving the input of the data use warning value and the data use limit value from a user. The user interface includes data usage 1001 used during a period specified by a user. The data usage 1001 may be displayed in a time series graph form 1004 using data used within a specified time period. In an embodiment of the present disclosure, the user interface enables the adjustment of the data use warning value 1003 and the data use limit value 1002 through the selection and dragging by the user. For example, referring to FIG. 10, the data use limit value 1002 is set to be 24 GB, but if data use limit value 1002 is selected by the user and a downward drag input is received from a user, data use limit value 1002 may be changed to 23 GB. For example a data use warning value 1003 is set to be 22 GB, but if data warning value 103 is selected by the user and an upward drag input is received from a user, data warning value 103 may be changed to 23 GB.

While the present disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic apparatus, comprising:
a touch screen display;
a transceiver configured to transceive data via a network;
a processor; and
a memory configured to store instructions, which when executed, instruct the processor to:
set a warning value that represents an amount of data usage at which a notification is provided to a user,
identify a total data usage transceived through the transceiver,
set a first reference use value based on a first difference value between the warning value and the identified total data usage, wherein the first reference use value represents a data increment at which the total data usage is checked, re-identify the total data usage each time data usage transceived through the transceiver, from a time the total data usage was identified, reaches the first reference use value, set a second reference use value based on a second difference value between the re-identified total data usage and the warning value, change to the second reference use value from the first reference use value, and re-identify the total data usage each time data usage transceived through the transceiver, from a time the total data usage was re-identified, reaches the second reference use value.

2. The electronic device of claim 1, wherein the first reference use value is based on a result value obtained by dividing the first difference value by an arbitrary value, and wherein the second reference use value is based on a result value obtained by dividing the second difference value by the arbitrary value.

3. The electronic device of claim 2, wherein the memory is further configured to store an instruction to:

set a first value to be the first reference use value corresponding to a first condition, and set a second value to be the second reference use value corresponding to a second condition, if the result value obtained by dividing the second difference value between the total data usage and the warning value by the arbitrary value satisfies the second condition.

4. The electronic device of claim 3, wherein the memory is further configured to store an instruction to:

re-identify the total data usage, if data usage transceived through the transceiver reaches the second reference use value set as the second value corresponding to the second condition, and set a third value to be a third reference use value corresponding to a third condition, if the result value obtained by dividing a third difference value between the total data usage and the warning value by the arbitrary value satisfies the third condition.

5. The electronic device of claim 1, wherein the memory is further configured to store an instruction to display a warning notification on the display, if the total data usage exceeds the warning value.

6. The electronic device of claim 1, wherein the memory is further configured to store an instruction to set a limit value and display a notification requesting the warning value to be reset on the display, if the total data usage exceeds the warning value and does not exceed the limit value.

7. The electronic device of claim 6, wherein the memory is further configured to store an instruction to set at least one of the limit value and the warning value on the touch screen display by receiving an input from a user.

8. A method for identifying data usage in an electronic apparatus, the method comprising:

setting a warning value representing an amount of data usage at which a notification is provided to a user;

identifying a total data usage transceived through a transceiver;

setting a first reference use value based on a first difference between the warning value and the identified total data usage, wherein the first reference use value represents a data increment at which the total data usage is checked;

re-identifying the total data usage each time data usage transceived through the transceiver, from a time the total data usage was identified, reaches the first reference use value;

set a second reference use value based on a second difference value between the re-identified total data usage and the warning value;

changing to the second reference use value from the first reference use value; and re-identifying the total data usage each time data usage transceived through the transceiver, from a time the total data usage was re-identified, reaches the second reference use value.

9. The method of claim 8, wherein the first reference use value is based on a result value obtained by dividing the first difference value by an arbitrary value, and wherein the second reference use value is based on a result value obtained by dividing the second difference value by the arbitrary value.

10. The method of claim 9, wherein changing to the second reference use value comprises:

setting a first value to be the first reference use value corresponding to a first condition, if the result value satisfies the first condition to change the reference use value; and setting a second value to be the second reference use value corresponding to a second condition, if the result value obtained by dividing the second difference value between the total data usage and the warning value by the arbitrary value satisfies the second condition.

11. The method of claim 10, further comprising:

re-identifying the total data usage, if the measured data usage transceived reaches the second reference use value set as the second value corresponding to the second condition, and setting a third value to be a third reference use value corresponding to a third condition, if the result value obtained by dividing a third difference value between the total data usage and the warning value by the arbitrary value satisfies the third condition.

12. The method of claim 8, further comprising displaying a warning notification, if the total data usage exceeds the warning value.

13. The method of claim 8, further comprising:

setting a limit value; and displaying a notification requesting a warning value to be reset, if the total data usage exceeds the warning value and does not exceed the limit value.

14. The method of claim 13, wherein at least one of the limit value and the warning value is set by receiving an input from a user.

15. A non-transitory recording medium with a program stored therein, which when executed, controls an electronic device to:

set a warning value that represents an amount of data usage at which a notification is provided to a user, identify a total data usage transceived through a transceiver, set a first reference use value based on a difference between the warning value and the identified total data usage, wherein the first reference use value represents a data increment at which the total data usage is checked, re-identify the total data usage each time data usage transceived through the transceiver, from a time the total data usage was identified, reaches the first reference use value;

set a second reference use value based on a second difference value between the re-identified total data usage and the warning value, change to the second reference use value from the first reference use value, and re-identify the total data usage each time data usage transceived through the transceiver, from a time the total data usage was re-identified, reaches the second reference use value.

\* \* \* \* \*